March 12, 1946.    E. J. WIENKE    2,396,545
MOUNTING FOR SPROCKETS IN MOTION PICTURE APPARATUS Filed July 12, 1943

Inventor:
Emil J. Wienke,
By: Zabel, Carlson, Fitzbaugh & Wells
Attorneys

Patented Mar. 12, 1946

2,396,545

UNITED STATES PATENT OFFICE 2,396,545

MOUNTING FOR SPROCKETS IN MOTION-PICTURE APPARATUS

Emil J. Wienke, Glen Ellyn, Ill., assignor to Motiograph, Chicago, Ill., a limited partnership of Illinois Application July 12, 1943, Serial No. 494,313

2 Claims. (Cl. 287—53)

The present invention relates to means for mounting such devices as sprockets on a shaft. It is applicable not only to sprockets but to gears, sleeves, knobs, wheels, drums and the like.

It is the principal object of the invention to provide means whereby a device such as one of those above referred to that is bored to fit slidably upon a shaft may be locked in place so as to eliminate any springing action in the shaft and prevent end play.

It is also a purpose of the present invention to provide a mounting means such as above referred to which is extremely simple in its operation during the assembly and removal of a device from the shaft. The improvement is particularly useful in connection with sprockets such as are used in motion picture apparatus for driving the film. It makes it possible to reverse the sprocket end to end whenever desired so as to equalize wear on both sides of the teeth of the sprocket. It furthermore is particularly advantageous in balancing the device on the shaft, thus avoiding excessive wear on the bearings due to an unbalanced load on the shaft.

The features and advantages of the invention will appear more fully from the following description, reference being made to the accompanying drawing wherein a preferred form of the invention is shown. It should be understood, however, that the drawing and description are illustrative only and are not to be taken as limiting the invention except insofar as it is limited by the claims.

Figure 2:
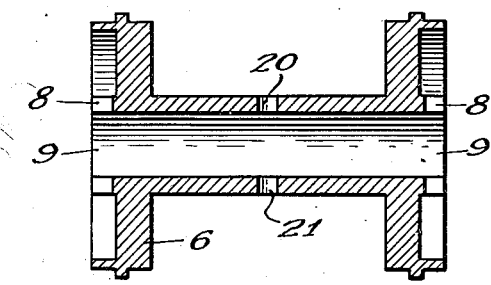
Fig. 2 is a longitudinal sectional view through a device such as a sprocket which is to be mounted on the shaft.
Figure 4:
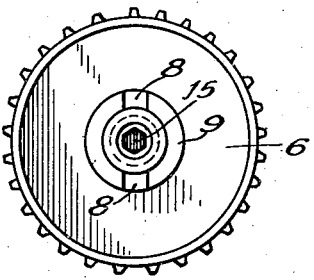
Fig. 4 is an end view of the assembly shown in Fig. 3 looking at the assembly from the right hand end.
Figure 3:
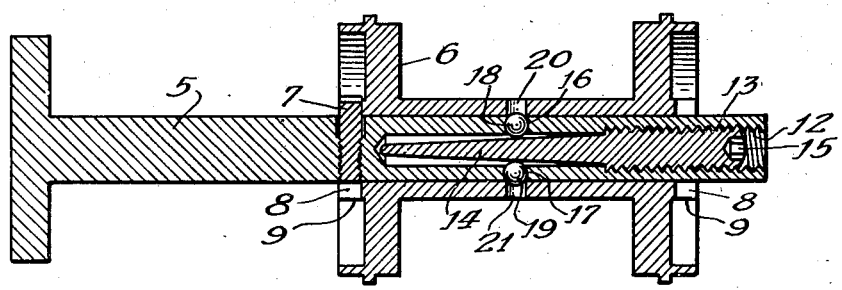
Fig. 3 is a longitudinal sectional view of the sprocket and shaft assembly.

Referring now to the drawing, the shaft is illustrated at 5. It may be a shaft which drives the device to be mounted thereon or it may be a shaft that is driven by the device mounted thereon. In the construction shown, the shaft is adapted to have a sprocket wheel 6 mounted thereon. For this purpose the shaft is provided with an aligning pin 7 which is threaded into the shaft 5 at a predetermined point and which is adapted to engage in one of the notches 8 that is provided at the ends of the sprocket wheel 6. It will be noted from an examination of Figs. 2 and 4 that both ends of the sprocket wheel are provided with annular flanges 9, which flanges are notched at diametrically opposite points to provide the notches 8. The locating pin 7 serves as a stop in positioning the sprocket wheel 6, and it also serves as a means to prevent rotation of the sprocket wheel during the locking of the sprocket wheel to the shaft by my improvement.

Figure 1:
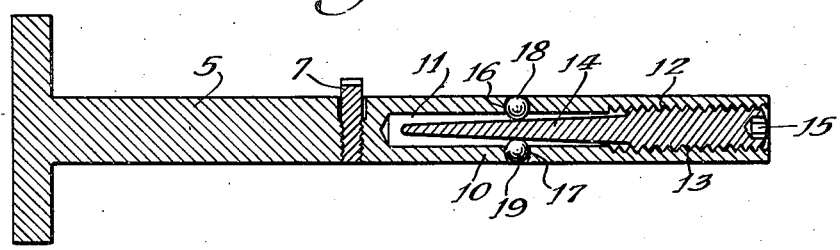
Fig. 1 is a longitudinal sectional view through a shaft embodying parts of the invention.

Referring now to Fig. 1, the shaft 5 is provided with a portion 10 that has a central bore 11 extending axially thereof from one end of the shaft. This bore has an enlarged part provided with interior threads 12 as shown, which threads are adapted to receive a corresponding threaded portion 13 of a tapered pin 14. A polygonal recess 15 is provided at the end of the tapered pin so that it may be turned with a wrench. It is desirable to make the threaded part of the pin 14 long enough to insure proper axial directing thereof.

The portion 10 of the shaft is drilled transversely to provide two oppositely disposed apertures 16 and 17 which are opposite the tapered portion of the pin 14. These apertures preferably are slightly larger in diameter than the thickness of the wall of the shaft portion 10 so that they may receive two balls 18 and 19. The balls are held against dropping out by swaging over the metal at the outer ends of the apertures 16 and 17 so as to reduce the size of the apertures or partially close them at the surface of the shaft.

The device 6 is also transversely drilled to provide two apertures 20 and 21 which are diametrically opposite each other. These apertures are considerably smaller in diameter than the apertures 16 and 17. Now when the device 6 is to be assembled on the shaft 5 the pin 14 is moved until the balls 18 and 19 have their outermost surfaces flush with or slightly inside the surface of the shaft. The interior diameter of the sprocket wheel is of course made so as to snugly fit the shaft but so as to slide thereon without being driven. The sprocket wheel is placed on the shaft and moved up until it engages the locating pin 7 in one of the notches 8. In this position the apertures 20 and 21 are substantially aligned with the apertures 16 and 17. In order to lock the sprocket wheel on the shaft the pin 14 is turned to advance it into the shaft and thereby force the balls 18 and 19 outwardly in the apertures 16 and 17 until they engage tightly in the apertures 20 and 21. This locks the shaft and sprocket wheel together without springing the shaft and without tipping the sprocket wheel on the shaft.

The removal of the sprocket wheel or other device 6 is very easily accomplished. It is merely necessary to turn the tapered pin 14 so as to retract it enough to allow the balls 18 and 19 to move inwardly far enough to clear the interior bore of the sprocket wheel. The sprocket wheel can then be taken off and reversed end for end or replaced with a new one.

From the foregoing description it is believed that the nature and advantages of my invention will be readily apparent to those skilled in the art.

Having thus described my invention, what I claim as new and desire to secure by Letters Patent is:

1. Film sprocket wheel mounting means comprising a shaft provided with a central axial bore, said shaft having a transverse aperture therein adjacent one end of said bore, an aligning pin therein and projecting therefrom, a film sprocket wheel on said shaft having an end slot to receive the projecting portion of said aligning pin and provide circumferential and axial locating means for said sprocket wheel, said shaft having oppositely disposed apertures extending into said axial bore, said sprocket wheel having oppositely disposed apertures aligned with the oppositely disposed apertures in the shaft and smaller in diameter than the shaft apertures, balls in said shaft apertures, and a tapered pin adjustable endwise in the central bore of said shaft for pressing the balls outwardly into the apertures in the sprocket wheel.

2. Film sprocket wheel mounting means comprising a shaft provided with a central axial bore, said shaft having a transverse aperture therein adjacent one end of said bore, an aligning pin therein and projecting therefrom, a film sprocket wheel on said shaft having like slots in the opposite ends thereof to receive the projecting portion of said aligning pin and provide circumferential and axial locating means for said sprocket wheel, said shaft having oppositely disposed apertures extending into said axial bore, said sprocket wheel having oppositely disposed apertures midway between the aligning slots at its opposite ends and aligned with the oppositely disposed apertures in the shaft and smaller in diameter than the shaft apertures, balls in said shaft apertures, and a tapered pin adjustable endwise in the central bore of said shaft for pressing the balls outwardly into the apertures in the sprocket wheel.

EMIL J. WIENKE.